(12) United States Patent  
Yang

(10) Patent No.: US 6,559,394 B2  
(45) Date of Patent: May 6, 2003

(54) AIR CIRCUIT BREAKER

(75) Inventor: Ki Soo Yang, Daejeon (KR)

(73) Assignee: LG Industrial Systems Co., Ltd., Seoul (KR)

( * ) Notice: Subject to any disclaimer, the term of this patent is extended or adjusted under 35 U.S.C. 154(b) by 0 days.

(21) Appl. No.: 09/996,943

(22) Filed: Nov. 30, 2001

(65) Prior Publication Data

US 2002/0079201 A1 Jun. 27, 2002

(30) Foreign Application Priority Data

Dec. 1, 2000 (KR) .................................. 2000-0072366

(51) Int. Cl.⁷ ................................................ H01H 9/00
(52) U.S. Cl. .................................. 200/50.26; 200/308
(58) Field of Search ........................... 200/50.21–50.26, 200/308; 361/605–609, 615

(56) References Cited

U.S. PATENT DOCUMENTS

| | | | | | |
|---|---|---|---|---|---|
| 4,051,335 A | * | 9/1977 | Ericson et al. | ............. | 200/50.26 |
| 5,337,210 A | * | 8/1994 | Ishikawa et al. | ............. | 361/608 |
| 5,973,278 A | * | 10/1999 | Wehrli et al. | ................. | 200/308 |
| 6,005,208 A | * | 12/1999 | Castonguay | ................. | 200/308 |
| 6,380,501 B1 | * | 4/2002 | Figueroa et al. | ............ | 200/308 |

* cited by examiner

*Primary Examiner*—Michael Friedhofer  
(74) *Attorney, Agent, or Firm*—Birch, Stewart, Kolasch & Birch, LLP

(57) ABSTRACT

In an air circuit breaker, in order to provide a position indicating apparatus of a draw out type air circuit breaker which is capable of distinguishing a position of a breaker body accurately even a user can not distinguish colors by improving a structure for indicating a position of the breaker body, in a position indicating apparatus of an draw out type air circuit breaker comprising a lead bar rotatably placed at a base frame and moving in a direction opposite to a moving direction of a lead screw by abutting to one wall surface of a cradle and a cam connected to the lead bar and rotating by the linear movement of the lead bar, the position indicating apparatus includes a movable plate connected to the cam and converting the rotation of the cam into the vertical linear motion, an indicating cam connected to the movable plate, converting the vertical linear motion of the movable plate into the rotation motion and having a portion indicating a position of the breaker body according to the rotation, and a front plate placed at the front of the movable plate and selectively indicating a position of the breaker body according to the rotation of the indicating cam.

6 Claims, 10 Drawing Sheets

AIR CIRCUIT BREAKER

BACKGROUND OF THE INVENTION

1. Field of the Invention

The present invention relates to a draw out type air circuit breaker, and in particular to a draw out type air circuit breaker which is capable of distinguishing accurately a disconnected position, a testing position and a connected position when a breaker is pushed in/drew out from a cradle.

2. Description of the Prior Art

Generally, an air circuit breaker is installed between a load equipment and electric power in order to protect the load equipment such as a motor and a converter, etc. and a line from an abnormal current (a short circuit, a ground fault, an over current) generated at an electric circuit such as a power transmission/distribution line and private power transforming facilities, etc. Particularly, an air circuit breaker is a breaker for extinguishing an arc generated in opening and closing of a contact within the air.

An air circuit breaker is divided into a fixed type fixedly installed between an electrical power and an electrical load and a draw out type in which a breaker is movable so as to be separated from a power terminal and a load terminal in order to facilitate maintenance and secure stability.

FIG. 1 is a side view illustrating a state in which a cradle is separated from a breaker body in a general draw out type air circuit breaker being applicable a position indicating apparatus in accordance with the present invention.

The draw out type air circuit breaker includes a cradle 100 having an opened side toward a breaker body 200 and provided with a power source terminal 202 connected to electrical power source and a load terminal 204 connected to an electrical load equipment, a breaker body 200 movable so as to be pushed in/drew out from the cradle 100 and connecting or disconnecting a circuit between the power source and the load, and an interlock apparatus 300 for indicating a present position such as a disconnected position, a testing position, a connected position of the breaker body 200 when the breaker body 200 is pushed in/drew out from the cradle 100.

Herein, connectors 206, 208 are respectively connected to the power source terminal 202 and the load terminal 204 of the cradle 100, the connectors 206, 208 are respectively connected to a power source terminal 210 and a load terminal 212 projected from the breaker body 200, accordingly the cradle 100 and the breaker body 200 are mechanically and electrically connected each other.

And, the cradle 100 includes a guide frame 214 for guiding the translocation of the breaker body 200 when the breaker body 200 is pushed in/drew out.

FIG. 2 is a side view illustrating an interlock apparatus of a draw out type air circuit breaker in accordance with the prior art.

The interlock apparatus in accordance with the prior art includes a base frame 102 fixed to the breaker body 200, a lead screw 104 supported by the base frame 102 so as to be rotatable, a screw pipe 106 fixed to the cradle 100 and inserted by the lead screw 104, a position indicating apparatus 108 installed on the base frame 102 and for indicating a position of the breaker body 200 when the lead screw 104 is meshed with the screw pipe 106, and a lock slide 110 connected to the position indicating apparatus and for locking a position when the breaker body 200 is placed at one of the disconnected position, the testing position or the connected position.

The position indicating apparatus 108 includes a lead bar 112 placed so as to be parallel with the lead screw 104, abutted to one wall surface of the cradle 100 and retreated relatively when the lead screw 104 is meshed with the screw pipe 106 and linearly moves, a cam 114 connected to the lead bar 112 and installed on the base frame 102 so as to be rotatable in order to perform a rotation motion while retreating of the lead bar 112, and a indicating means 107 connected to one end of the cam 114 and for indicating a position of the breaker body 200 by linearly moving in accordance with the rotation of the cam 114.

In the lead bar 112, a lead bar 112 is a rod shaped member having a predetermined length and portion of the lead bar 112 is installed at the side of the lead screw 104 so as to be parallel with the lead screw 104, the other portion of is the lead bar 112 is curved so as to be inserted into a slot 118 formed at the cam 114.

And, a breakaway preventing member 120 for preventing a breakaway of the lead bar 112 from the slot 118 is installed on the end of the lead bar 112 inserted into the slot 118.

A return spring 122 for providing an elastic force in order to return the lead bar 112 to an its original position after operation is installed between the breakaway preventing member 120 and the base frame 102.

The cam 114 has a hinge portion 126 so as to be rotatively installed to the base frame 102, a slot 118 in which the lead bar 12 is inserted is provided at the lower portion of the hinge portion 126 so as to be curved a certain times at a predetermined angle, and a connection pin 124 connected to an indicating plate 150 placed at the front of the hinge portion 126.

As depicted in FIG. 3, the indicating means 107 includes an indicating plate 150 placed at the rear of the base frame 102 so as to be linearly movable up and down, a front plate 152 placed at the front of the indicating plate 150, and a guide plate 154 placed a the rear of the indicating plate 150, fixed to the base frame 102 and for guiding the up and down movement of the indicating plate 150.

The indicating plate 150 is a flat plate and is provided with a color indicating portion 156 on the its upper front surface in order to indicate a position of the breaker body 200 with colors, and a connection pin 124 of the cam 114 is connected to one side surface of the indicating plate 150.

The front plate 152 is placed at the front of the indicating plate 150, fixed to the base frame 102 and has three display windows 158, 160, 162 for indicating a position of the color indicating portion 156 of the indicating plate 150, and a handle insertion hole 164 is formed at the center of the front plate 152 in order to insert a handle (not shown) for rotating the lead screw 104.

In the indicating means 107, when the indicating plate 150 connected to the cam 114 by the connection pin 124 moves up and down according to the rotation of the cam 114, the color indicating portion 156 provided on the indicating plate 150 is indicated with colors on the indicating windows 158, 160, 162 of the front plate in order to inform a user about a present position of the breaker body 200.

In the interlock apparatus of the draw out type air circuit breaker in accordance with the prior art, in order to connect the cradle 100 to the breaker body 200, the breaker body 200 is placed on a guide frame 14 of the cradle 100 and is pushed in, accordingly the breaker body 200 is moved into the cradle 100. When the lead screw 104 contacts to the screw pipe 106 according to the translocation of the breaker body 200 and a user rotates the lead screw 104 by using the handle, the lead screw proceeds into the screw pipe 106 while rotating.

Then, the two connection terminals 210, 212 projected from the breaker body 200 are inserted into the two connectors 206, 208 installed to the cradle 100, accordingly the power source terminal 202 and the load terminal 204 are connected each other.

When the lead screw 104 proceeds, the lead bar 112 contacts to the one wall surface of the cradle 100, herein the lead bar 112 moves in a direction opposite to the lead screw 104. As described above, when the lead bar 112 retreats, it rotates the cam 114 while moving along the slot 118 of the cam 114, by the rotation of the cam 114 the indicate plate 150 moves to the upper portion. Herein, a color indicating portion 156 provided on the indicating plate 150 is indicating one of the three indicating windows 158, 160, 162 of the front plate 152 in order to indicate a present position of the breaker body 200.

In more detail, when the two connection terminals 210, 212 projected from the breaker body 200 and the connectors 206, 208 installed to the cradle 100 are not connected each other, power is in the cut-off state, the color indicating portion 156 of the indicating plate 150 is indicated on the lowest indicating window 158 of the three indicating windows. Accordingly, the user recognizes a preset position as a disconnected position.

And, the lead screw 104 proceeds a certain degree, control power is applied, when the breaker body 200 reaches the testing position in which a user checks and tests each part of the breaker, the indicator plate 150 moves up a certain degree, the color indicating portion 156 is displayed on a middle indicating window 160 of the three indicating windows, accordingly the user recognizes the breaker body 200 is at the testing position. When the lead screw 104 proceeds completely, the connection terminals 210, 212 are inserted into the connectors 206, 208 installed to the cradle 100 and reaches the connected position in which main power is supplied, the color indicating portion 156 is indicated on the upper indicating window 162, accordingly the user recognizes the breaker body 200 is at the connected position.

However, in the position indicating t of the draw out type circuit breaker in accordance with the prior art, in order to indicate a position of a breaker body, because a color indicating portion of an indicate plate is indicated through a indicating window of a front plate, when a user can not distinguish colors, it is difficult to know a position of the indicating portion indicated on the indicating window with colors, in addition when impurities stick to the indicating, it is difficult is to recognize a color of the indicating portion.

SUMMARY OF THE INVENTION

In order to achieve the above-mentioned problems, it is an object of the present invention to provide a position indicating apparatus of a draw out type circuit breaker which is capable of distinguishing a position of a breaker body accurately even a user can not distinguish colors by improving a structure of the position indicating apparatus.

In order to achieve the above-mentioned object, in an air circuit breaker comprising a movable breaker body having a power source terminal and a load terminal and connecting or disconnecting a circuit between power and a load, a cradle electrically and mechanically connected/separated to/from the breaker body in accordance with movement of the breaker body and having connectors electrically and mechanically connected to the breaker body, a screw pipe for guiding the contact/separation to/from the breaker body and a power terminal and a load terminal respectively connected to the power source and the load, a base frame fixed to the breaker body, a lead screw supported by the base frame so as to be rotatable and movable to a position for being inserted into the screw pipe and a position for being separated from the screw pipe, a lead bar assembly having a lead bar supported by the base frame so as to perform a horizontal linear movement, extended so as to be parallel with the lead screw and linearly moving a distance corresponded to the translocation of the lead screw in a direction opposite to a forward direction of the lead screw when it is pushed in/drew out from the lead screw pipe and a spring for applying an elastic force to the lead bar in the insertion direction of the lead screw, a cam connected to the lead bar and for converting the linear movement of the lead bar into a rotation movement and a position indicating apparatus connected to the cam and for indicating a position of the breaker body according to the translocation of the lead screw, the position indicating apparatus comprises a first power converting means connected to the cam and for converting the rotation of the cam into a horizontal linear motion, a second power converting means connected to the first power converting means and for converting the linear motion of the first power converting means into the rotation, and an indicating means for indicating a position of the breaker body according to the rotation of the second power converting means.

BRIEF DESCRIPTION OF THE DRAWINGS

FIG. 7b is a sectional view taken along the line A—A of FIG. 7a;

FIG. 8b is a sectional view taken along the line B—B of FIG. 8a;

FIG. 9b is a sectional view taken along the line C—C of FIG. 9a; and

DETAILED DESCRIPTION OF THE PREFERRED EMBODIMENT

Embodiments of an air circuit breaker in accordance with the present invention will be described with reference to accompanying drawings.

There can be a plurality of embodiments of an interlock position indicating apparatus of an air circuit breaker in accordance with present invention, hereinafter the most preferred embodiment of the present invention will be described with reference to accompanying FIG. 6.

Figure 4:
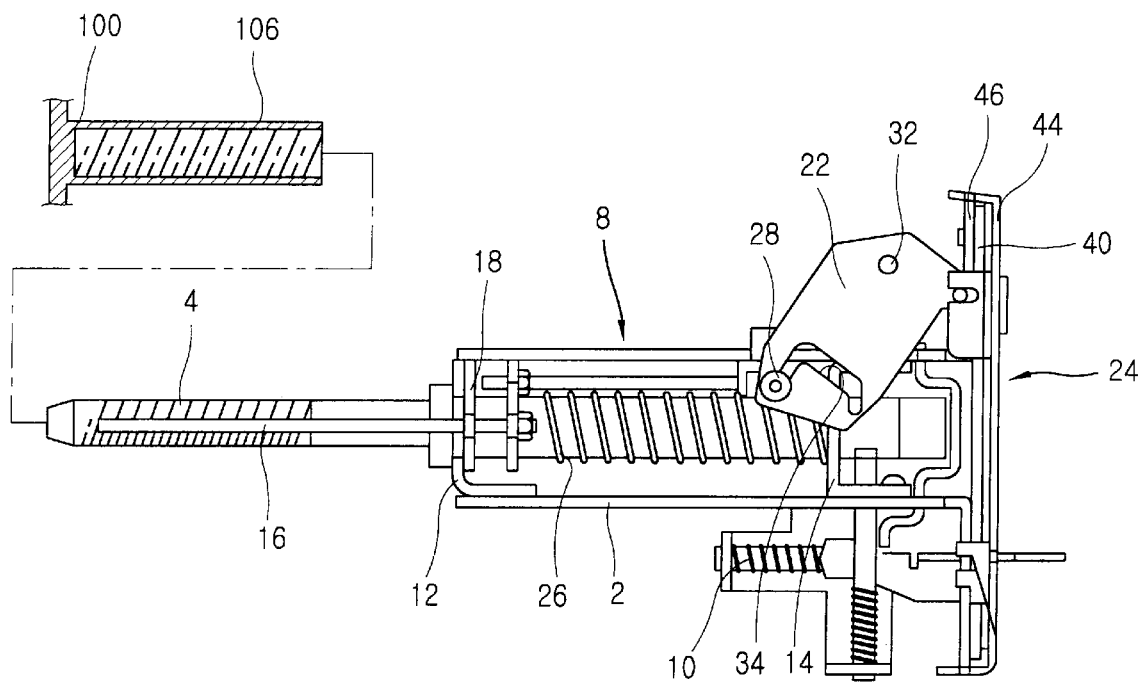
FIG. 4 is a side view illustrating an interlock position indicating apparatus of a draw out type air circuit breaker in accordance with the present invention.

FIG. 4 is a side view illustrating an interlock position indicating apparatus of a draw out type air circuit breaker in accordance with the present invention.

Figure 1:
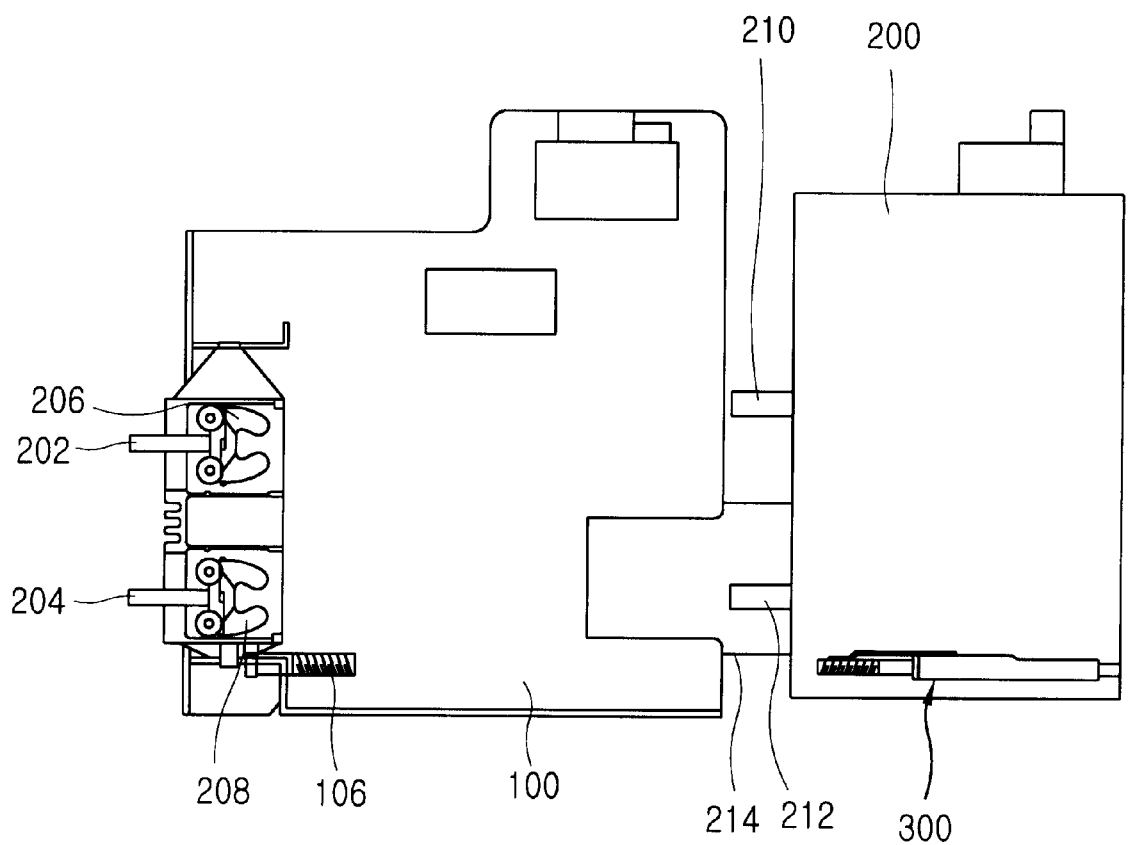
FIG. 1 is a side view illustrating a general draw out type air circuit breaker.
Figure 2:
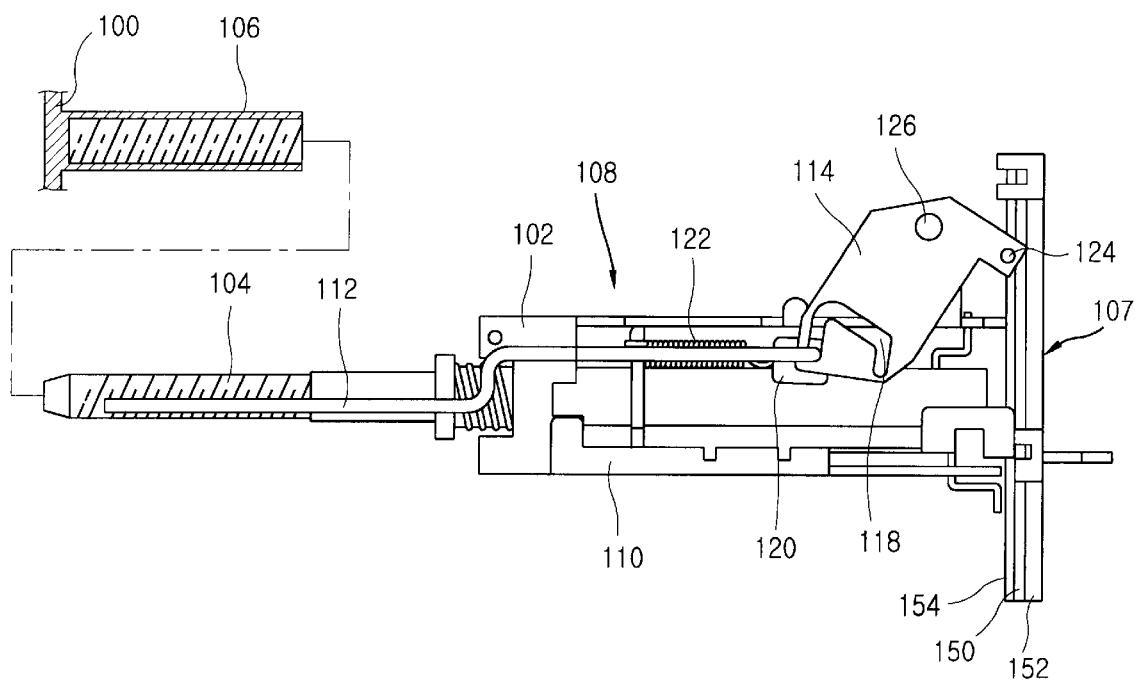
FIG. 2 is a side view illustrating an interlock position indicating apparatus of a draw out type air circuit breaker in accordance with the prior art.
Figure 3:
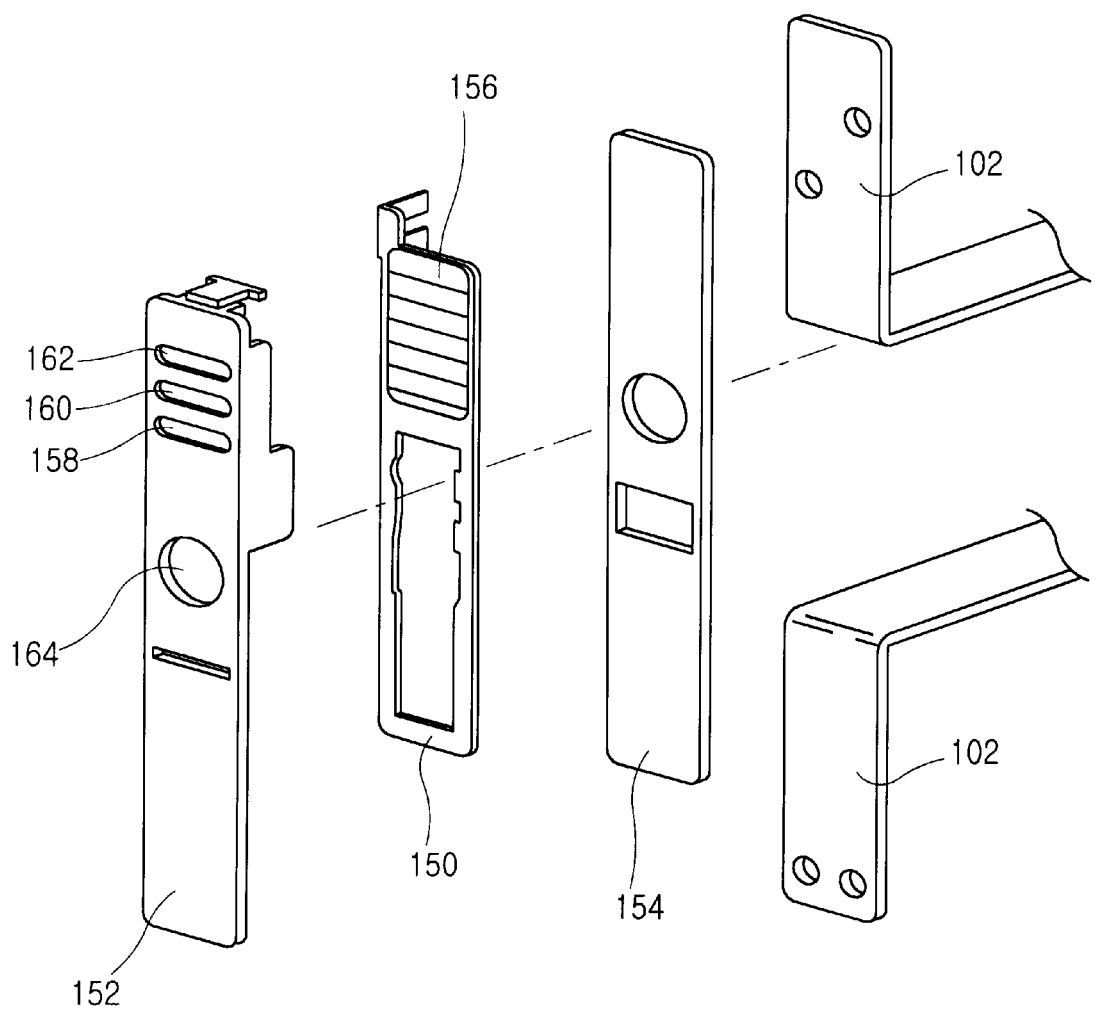
FIG. 3 is a disassembled perspective view illustrating an indicating apparatus of an interlock position indicating apparatus in accordance with the prior art.

The draw out type air circuit breaker in accordance with the present invention will be described with reference to FIG. 1 illustrating major parts of a general air circuit breaker and FIG. 4 illustrating an interlock position indicating apparatus in accordance with the present invention applicable to the general air circuit breaker.

The air circuit breaker in accordance with the present invention includes a breaker body 200 having an electrical power source terminal 210 and an electrical load terminal 212, movable, connecting or disconnecting a circuit between power source and a load; a cradle 100 electrically and mechanically connected to or separated from the breaker body 200 in accordance with movement of the breaker body 200 and having connectors 206, 208 for electrically and mechanically connected to the power source terminal 210 and the load terminal 212 of the breaker body 200, a screw pipe 106 for guiding the connecting to or separation from the breaker body 200 and a power source terminal 202 and a load terminal 204 respectively connected to the electrical power source and the electrical load; a base frame 2 fixed to the breaker body 200; a lead screw 4 supported by the base frame 2 so as to be rotatable and movable to a position for being inserted into the screw pipe 106 and a position for being separated from the screw pipe 106; a lead bar assembly having a lead bar 16 supported by the base frame 2 so as to perform a horizontal linear movement, extended so as to be parallel with the lead screw 4 and linearly moving so as to be corresponded to a translocation of the lead screw 4 in a direction opposite to a forward direction of the lead screw 4 when it is pushed in the lead screw pipe 106 or is draw out from the lead screw pipe 106; and a spring 26 for applying an elastic force to the lead bar 16 in the insertion direction of the lead screw 4, a cam 22 contacted to the lead bar 16 and for converting the linear movement of the lead bar 16 into the rotation motion, and a position indicating apparatus 24 connected to the cam 22 and for indicating a position of the breaker body 200 according to the translocation of the lead screw 4.

As depicted in FIG. 4, the base frame 2 is constructed with two steel plates having a "L" shape and a "L" shaped front supporting panel 12 for connecting the two steel plates so as to have a certain distance each other, and two steel plates having a "L" shape are laid on and installed to the lower portion of the breaker body 200. A rear supporting panel 14 fixedly installed to the rear of the base frame 2 is further included in order to support the rear end portion of the lead screw 4.

Accordingly, the lead screw 4 is supported so as to be rotatable by the front supporting panel 12 and the rear supporting panel 14 of the base frame 2. A thread is formed on the outer circumference of the front end of the lead screw 4, the front end of the lead screw 4 is meshed with the screw pipe 6 having a thread at the inner circumference and fixed to the cradle 100. In more detail, in order to connect the breaker body 200 to the cradle 100, when the breaker body 200 is pushed in the cradle 100, a user rotates the lead screw 4 in the clock wise to direction by using the handle, the threaded front end portion of the lead screw 4 is meshed with the screw pipe 6 of the cradle 100, when the user rotates the lead screw 4 in the counter-clockwise direction by using the handle for testing or disconnecting the breaker body 200, the threaded front end portion of the lead screw 4 is separated from the screw pipe 6 of the cradle 100.

A locking device 10 is installed to the lower portion of the base frame 2 in order to lock the position of the breaker body 200 when the breaker body 200 is moved to the disconnected position or the testing position or the disconnected position.

The position locking is performed by inserting a lock bolt into a groove formed at the rear end of the lead screw 4 by the elastic force of a spring (not having a reference numeral), and the position locking is released by pushing a slide bar projected from the lower portion of the indicating apparatus 24 in by the user. For more detailed construction and the operation of the locking device 10, it is possible to refer to the Korea patent application No. 2000-2041 (filing date: Jan. 17th, 2000) by filed by the assignee of the present invention.

A groove (not shown) having a polygonal section is formed at the rear end of the lead screw 4 in the base frame in order to insert the handle.

The lead bar 16 is a bar-shaped member having a predetermined length extended from the base frame 2 toward the cradle 100 so as to be parallel with the front end of the lead screw 4. The front end of the lead bar 16 is free end, when the lead screw 4 is inserted into the screw pipe, it is contacted to one wall surface of the cradle 100 and is pressed by the wall surface, accordingly the lead bar 16 retreats in a direction opposite to the insertion direction (forward direction) of the lead screw 4. The other end of the lead bar 16 is connected to the cam 22 via the guide member 18.

The center of the guide member 18 is penetrated by the lead screw 4, the two steel plates performable the horizontal linear movement are connected each other on the outer circumference of the lead screw 4. In more detail, the guide member 18 penetrated by the lead screw 4 is installed on the outer circumference of the lead screw 4 inside the base frame 2 so as to be performable the horizontal linear movement and is connected to the portions of the lead bar 16 extended in the opposite direction viewing from the guide member 18. The guide member 18 guides the lead bar 16 so as to perform the horizontal linear movement accurately.

The spring 26 is installed between the guide member 18 and the rear supporting panel 14, the spring 26 returns the lead bar 16 to the original position by providing the elastic force to the lead bar 16 in the forward direction of the lead screw 4.

The spring 26 wound around the outer circumference of the lead screw 4 is a coil spring, one end is supported by the surface of the guide member 18 and the other end is supported by the rear supporting panel 14.

In the lead bar 16, the portion extended toward the cam 22 is connected between the guide member 18 and the cam 22, when the guide member 18 is linearly moved, it is linearly moved together with the guide member 18 and rotates the cam 22. One end of the lead bar 16 extended toward the cam 22 is connected to the guide member 18, and the other end is provided with a guide pin 28 inserted into a guide slot 34 formed at the cam 22 and the guide pin 28 is movable along the slot 34.

The cam 22 is installed on a hinge portion 32 projected from one surface of the base frame 2 and rotates, the slot 34 having a predetermined shape is provided at the lower portion of the cam 22 in order to be inserted by the movable guide pin 28 of the lead bar 16, and an operation protrusion 38 connected to the indicating apparatus 24 is eccentrically formed at the upper portion of the cam 22.

The position indicating apparatus 24 comprises a first power converting means connected to the cam 22 and for converting the rotation of the cam 22 into a horizontal linear motion, a second power converting means connected to the first power converting means and for converting the linear motion of the first power converting means into the rotation, and a indicating means for indicating a position of the breaker body according to the rotation of the second power converting means.

Figure 5:
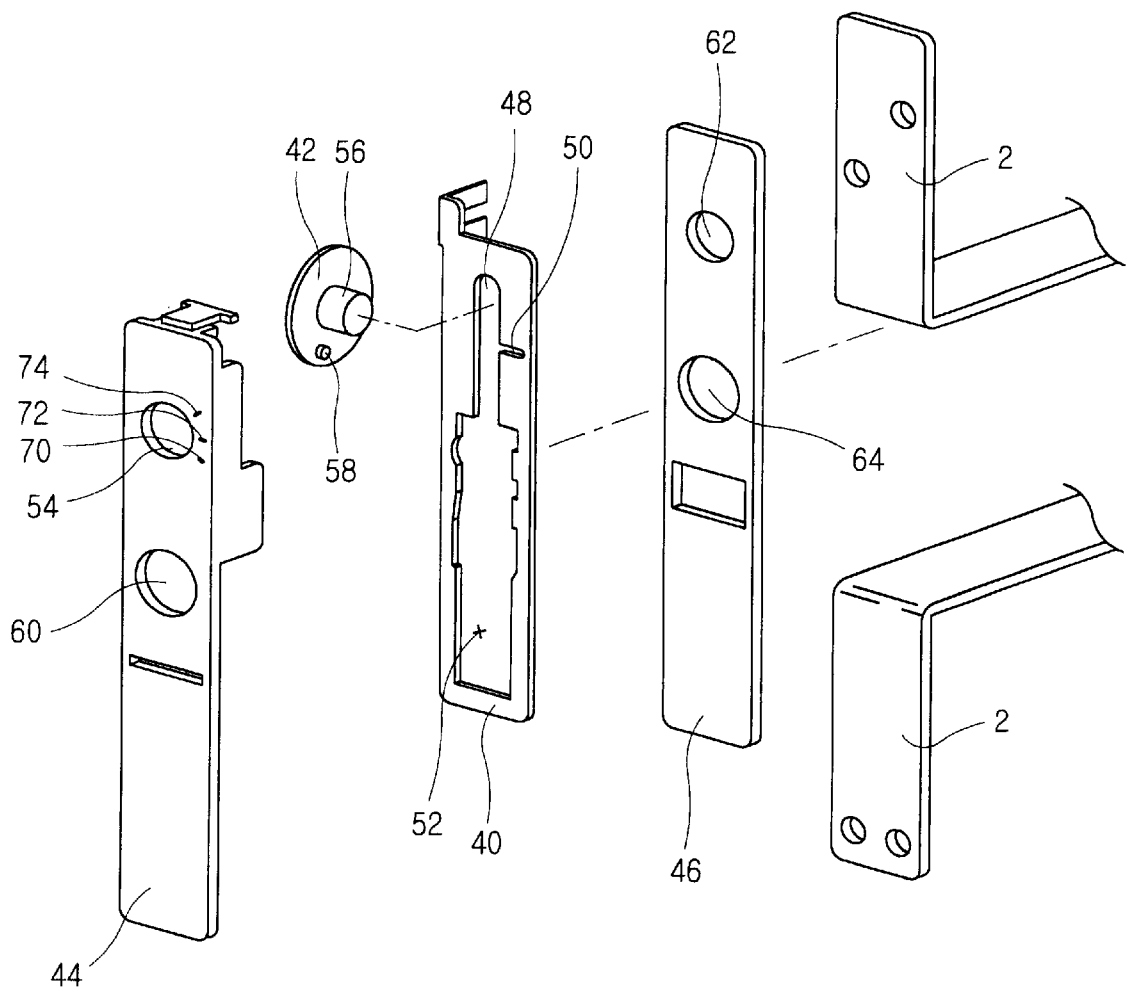
FIG. 5 is a disassembled perspective view illustrating an indicating apparatus of the interlock position indicating apparatus in accordance with the present invention.
Figure 6:
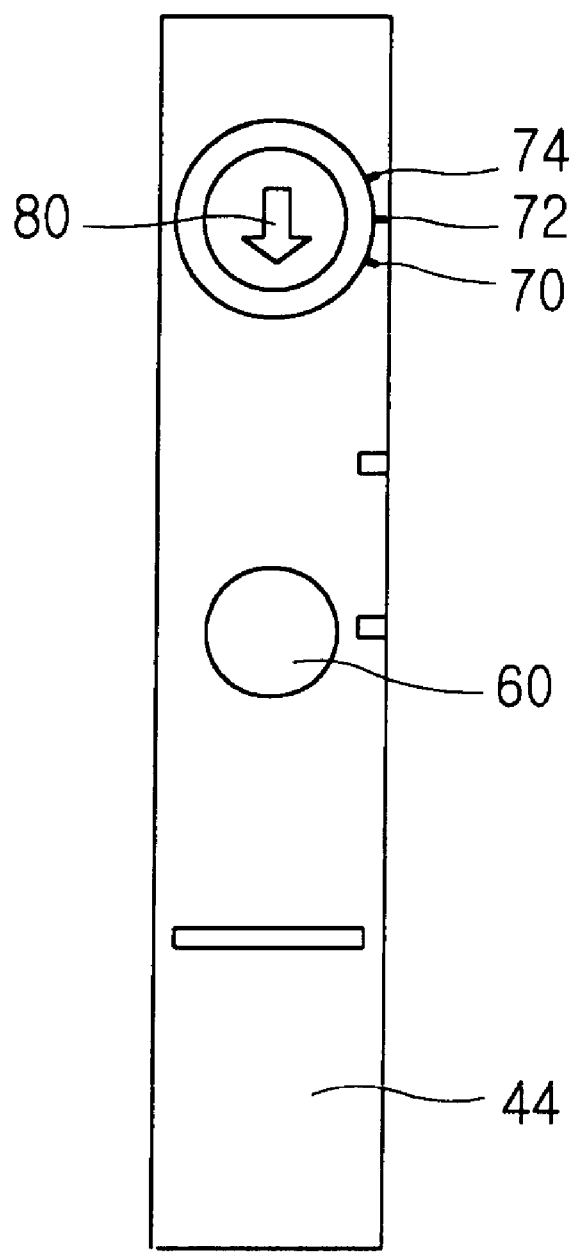
FIG. 6 is a front view illustrating the indicating apparatus of the interlock position indicating apparatus in a connected state in accordance with the present invention.

As depicted in FIGS. 5 and 6, a movable plate 40 placed at the rear of the base frame 2 so as to be linear-movable in a vertical direction and moving in the vertical direction in the rotation of the cam 22 by being connected to an operation protrusion 38 of the cam 22 is included in the position indicating apparatus 24 as the first power converting means. An indicating cam 42 connected rotatably and rotating while the vertical direction translocation of the movable plate 40 is included in the position indicating apparatus 24 as the second power converting means. A front plate 44 is fixedly installed at a front position of the movable plate 40 in order to indicate a position of the breaker body 200 by the rotation of the indicating cam 42.

A guide plate 46 is fixedly installed by being fixed to the base frame 2 at a rear position of the movable plate 40 in order to guide the up and down translocation of the movable plate 40.

The movable plate 40 is a flat-shaped member movable up and down while the rotation of the cam 22 by being connected to the cam 22, a guide hole 48 is formed at the upper portion in a length direction in order to insert and support the indicating cam 42 so as to be linearly movable, and a guide slit 50 having a predetermined length extended in a right angle direction, namely, a horizontal direction from the guide hole 48 is formed at the length direction center of the guide hole 48. A function of the guide slit 50 is for supporting and guiding the operation protrusion 58 of the indicating cam 42, the near portion of the guide slit 50 in the movable plate 40 transmits the dynamic power in the vertical direction of the movable plate 40 to the indicating cam 42. In more detail, when the movable plate 40 moves in the vertical direction, the circumference of the guide slit 50 presses the operation protrusion 58 of the indicating cam 42, accordingly the indicating cam 42 rotates.

And, a handle insertion hole 52 is formed at the lower portion of the guide hole 48 in order to allow a handle to pass through for rotating the lead screw 4.

The indicating cam 42 includes a disc shape portion, a position indicating portion extended from the upper and bottom surfaces of the disc shape portion (a small circle portion 80 having an arrow in FIGS. 6–8), a rotation axis portion 56 and an driving protrusion 58 eccentrically placed on the flat surface such as the rotation axis portion 56. The disc shape portion of the indicating cam 42 is placed between the front surface plate 44 and the movable plate 40, and the rotation axis portion 56 penetrates the guide hole 48 of the cam 42 and is supported by the inner circumference of a supporting hole 62 of the guide plate 46. The driving protrusion 58 of the indicating am 42 is placed in the guide slit 50 of the movable plate 40, when the movable plate 40 moves vertically, it transmits the dynamic power to the indicating cam 42, accordingly the indicating cam 42 rotates. There is a position indicating mark on the position indication portion 80 in order to indicate a position of the breaker body 200 by the rotation of the indicating cam 42 outside, the position indication mark can be formed various shapes at least illustrating a position simply and clearly according to the rotation of the indicating cam 42.

In the embodiment of the present invention, the indication mark on the position indicating portion 80 is formed as an arrow shape, accordingly an arrow indicating portion indicates the position of the breaker body 200.

The guide slit 50 of the movable plate 40 is formed so as to have a sufficient length in order to prevent a runaway of an operation protrusion 58 within a rotation range of the indicating cam 42 while the rotation of the indicating cam 42.

The front plate 44 is fixedly installed at a front position of the movable plate 40, and a hole 54 for receiving the position indication portion 80 of the indicating cam 42 so as to be rotatable is formed at the upper portion. In one preferred embodiment, a transparent window can be provided on the hole 54. The handle insertion hole 60 for inserting the handle for rotating the lead screw 4 is provided at the center portion of the front plate 44 in the length direction, and the overall shape of the front plate 44 is a flat plate. A horizontal slit not having a reference numeral formed at the lower portion of the handle insertion hole 60 is a groove for guiding in draw out/push in of a slide bar (not shown) of the locking unit 10.

On the front plate 44, a position marking portion for selectively indicating a position of the breaker body 200 by the arrow of the position indication portion 80 while the rotation of the indicating cam 42 is placed position near the circumference of the hole 54. The position marking portion includes a disconnected position marking portion 70, a testing position marking portion 72 and a connected position marking portion 74 placed at predetermined intervals.

The guide plate 46 is a flat shaped member, placed between the movable plate 40 and the base frame 2 and for guiding the up and down vertical movement of the movable plate 40, a supporting hole 62 is formed at the upper portion in order to support the rotation axis portion 56 of the indicating cam 42 rotatably, and a handle insertion hole 64 is formed at the center in the length direction in order to allow the handle to pass through.

The operation of the draw out type air circuit breaker in accordance with the present invention will be described.

FIGS. 7a, 7b, 9a, 9b are state diagrams illustrating an operation of the display unit in accordance with the present invention.

First, translocating the breaker body 200 from the connected position or the testing position to the disconnected position will be described.

A user inserts the handle into the handle insertion groove of the lead screw 4 passing through the handle insertion hole 60 on the front plate 44, the handle insertion hole 52 of the movable plate 40 and the handle insertion hole 64 of the guide plate 46 and rotates the handle in the counter clockwise direction. Then, the lead screw 4 retreats and is separated from the screw pipe 106, the power source terminal 210 and the load terminal 212 of the breaker body 00 are separated from the connectors 206, 208 of the cradle 100, accordingly the breaker body 200 is placed at the disconnected position (circuit breaking position) in which the circuit between the power and the load is cut-off. Then, as depicted in FIG. 4, the pressing force from the wall surface of the cradle 100 for pressing the free end of the lead bar 16 is removed, the lead bar 16 forwards in a direction opposite to the forward direction of the lead screw 4 retreating by the elastic force of the spring 26, namely, horizontally and linearly in the left direction in FIG. 4. Accordingly, the cam 22 connected to the lead bar 16 by the guide pin 28 rotates in the clockwise direction. The clockwise direction rotation force of the cam 22 is transmitted to the movable plate 40 through the operation protrusion 38, so the movable plate 40 descends. The descent movement of the movable plate 40 rotates the indicating cam 42 connected to the movable plate 40 by the driving protrusion 58 in the clockwise direction as depicted in FIG. 6, the arrow on the position indicating portion 80 of the indicating cam 42 indicates the disconnected position marking portion 70 on the front plate 44 of FIG. 5, accordingly it indicates the breaker body 200 is on the disconnected position.

Figure 7A:
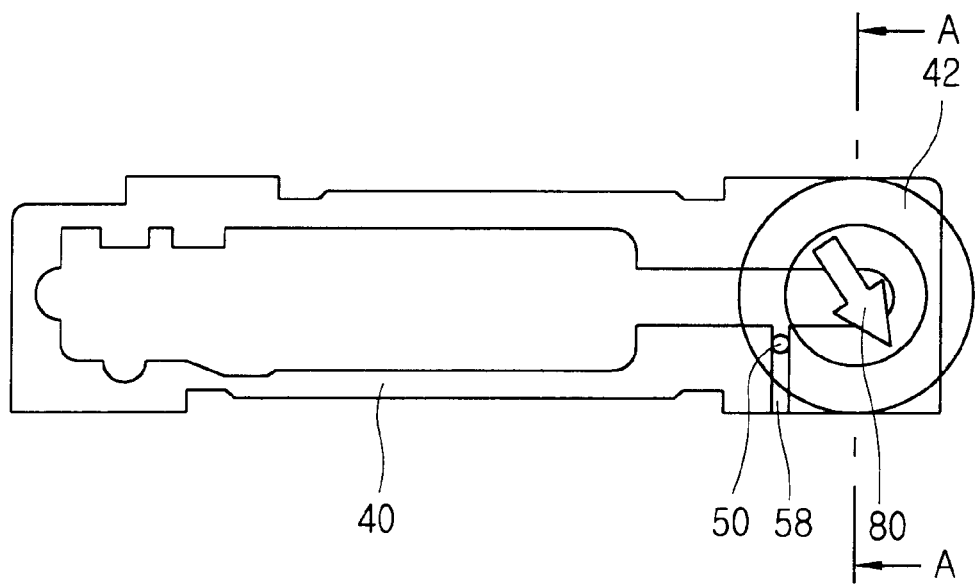
FIG. 7a is a state diagram illustrating an operation of the indicating apparatus of the interlock position indicating apparatus in accordance with the present invention.
Figure 7B:
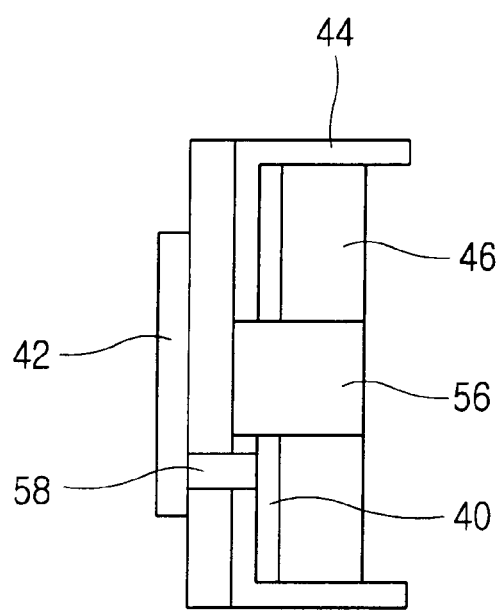

Herein, as depicted in FIG. 7a, the driving protrusion 58 of the indicating cam 42 moves in the left side in the guide slit 50 of the movable plate 40, and it is described in the sectional view of FIG. 7b.

In the meantime, the operation for moving the breaker body 200 from the disconnected position to the testing position will be described. When main electrical power source having a high voltage is not connected to the power source terminal 202 of the cradle 100, the user inserts the handle into the handle insertion groove of the lead screw 4 through the handle insertion hole 60 of the flat surface plate 44, the handle insertion hole 52 of the movable plate 40 and the handle insertion hole 64 of the guide plate 46 and rotates the handle in the clockwise direction at a predetermined degrees. Rotating the predetermined degrees is for inserting the lead screw 4 into the screw pipe 106 in half on the comparison with the full insertion in the connected position. Then, the connectors 206, 208 of the cradle 100 are connected to the power source terminal 210 and the load terminal 212 of the breaker body 200. In the state, a certain low voltage electric signal such as AC 220 volt commercial electric power is applied to the power source terminal 202 of the cradle 100 in order to test the circuit cut-off operation of the breaker.

Herein, the lead bar 16 is pressed by the wail surface of the cradle 100 and retreats in a direction opposite to the forward direction of the lead screw 4.

Accordingly, the cam 22 rotates in the counter clockwise direction correspondingly to the retreating stroke of the lead bar 16. Herein, the guide pin 28 is placed at the center in the length direction of the guide slot 34 of the cam 22. The counter clockwise direction rotation power of the cam 2 is transmitted to the movable plate 40 through the driving protrusion 38, and the movable plate 40 ascends a predetermined distance. The predetermined distance is half of an ascending distance of the movable plate 40 ascending from the disconnected position to the connected position.

As depicted in FIG. 7, the ascending movement of the movable plate 40 rotates the indicating cam 42 connected to the movable plate 40 by the driving protrusion 58 in the counter clockwise direction, the arrow on the position indicating portion 80 of the indicating cam 42 indicates the test position marking portion 72 on the front surface plate 44 of FIG. 5, accordingly it indicates the breaker body 200 is on the testing position to the user.

Figure 8A:
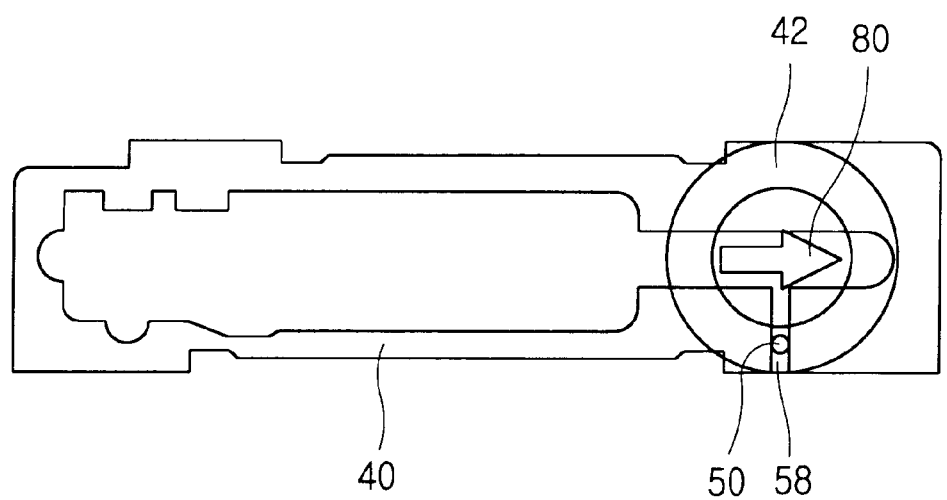
FIG. 8a is a state diagram illustrating an operation of the indicating apparatus of the interlock position indicating apparatus in accordance with the present invention.
Figure 8B:
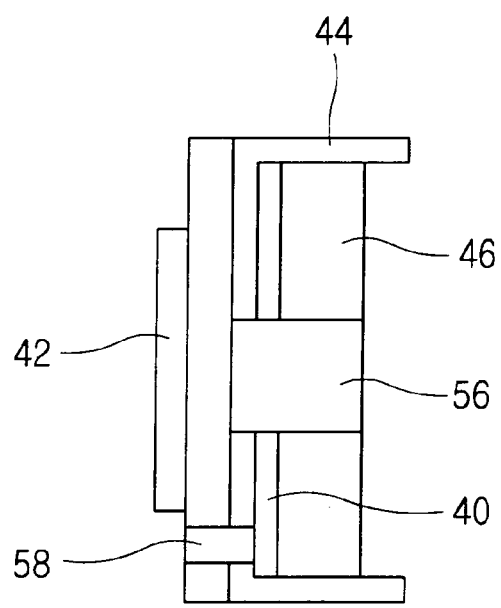

Herein, the driving protrusion 58 of the indicating cam 42 is moved to the center in the guide slit 50 of the movable plate 40 as depicted in FIG. 8a, and it is described in the sectional view of FIG. 8b.

In the meantime, the operation for translocating the breaker body 200 from the testing position to the connected position will be described.

When the main electric power source having a high voltage is connected to the power source terminal 202 of the cradle 100, the user inserts the handle into the handle insertion groove of the lead screw 4 through the handle insertion hole 60 of the flat surface plate 44, the handle insertion hole 52 of the movable plate 40 and the handle insertion hole 64 of the guide plate 46 and rotates fully the handle in the clockwise direction. By the rotation, the lead screw 4 is fully inserted into the screw pipe 106. Then, the power source terminal 210 and the load terminal 212 of the breaker body 200 are connected to the connectors 206, 208 of the cradle 100.

In the state, the lead bar 16 is completely pressed by the wall surface of the cradle 100 and retreats fully in a direction opposite to the forward direction of the lead screw 4. Accordingly, the cam 22 rotates more in the counter clockwise direction correspondingly to the retreating stroke of the lead bar 16. Herein, the guide pin 28 is placed at the left side in the length direction of the guide slot 34 of the cam 22. The rotation power in the counter clockwise direction of the cam 22 is transmitted to the movable plate 40 through the driving protrusion 38, and the movable plate 40 ascends fully.

As depicted in FIG. 8, the ascending movement of the movable plate 40 rotates the indicating cam 42 connected to the movable plate 40 by the driving protrusion 58 in the counter clockwise direction, the arrow on the position indicating portion 80 of the indicating cam 42 indicates the connected position marking portion 74 on the front plate 44, accordingly it indicates to the user the breaker body 200 is on the connected position.

Figure 9A:
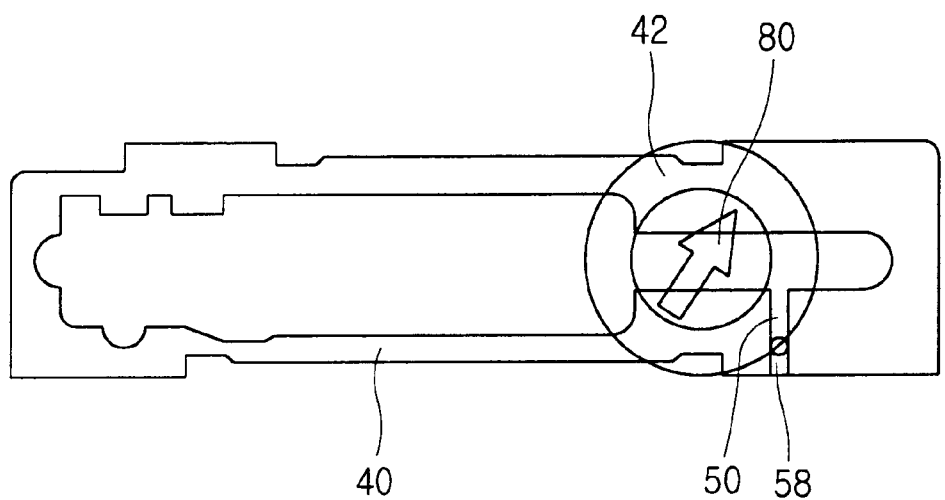
FIG. 9a is a state diagram illustrating an operation of the indicating apparatus of the interlock position indicating apparatus in accordance with the present invention.
Figure 9B:
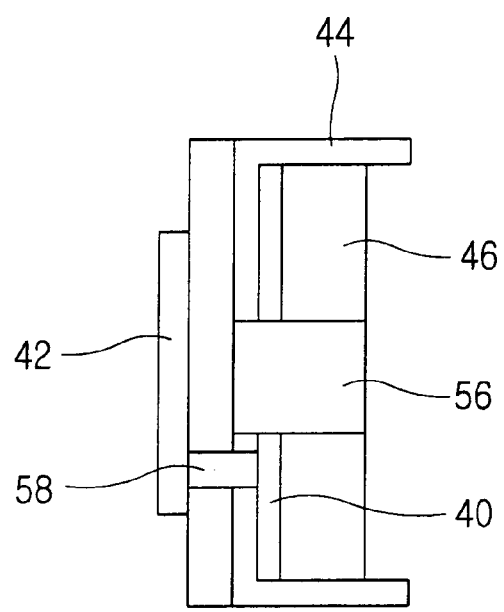

Herein, as depicted in FIG. 9a, the driving protrusion 58 of the indicating cam 42 is moved left in the guide slit 50 of the movable plate 40, and it is described in the sectional view of FIG. 9b.

Figure 10:
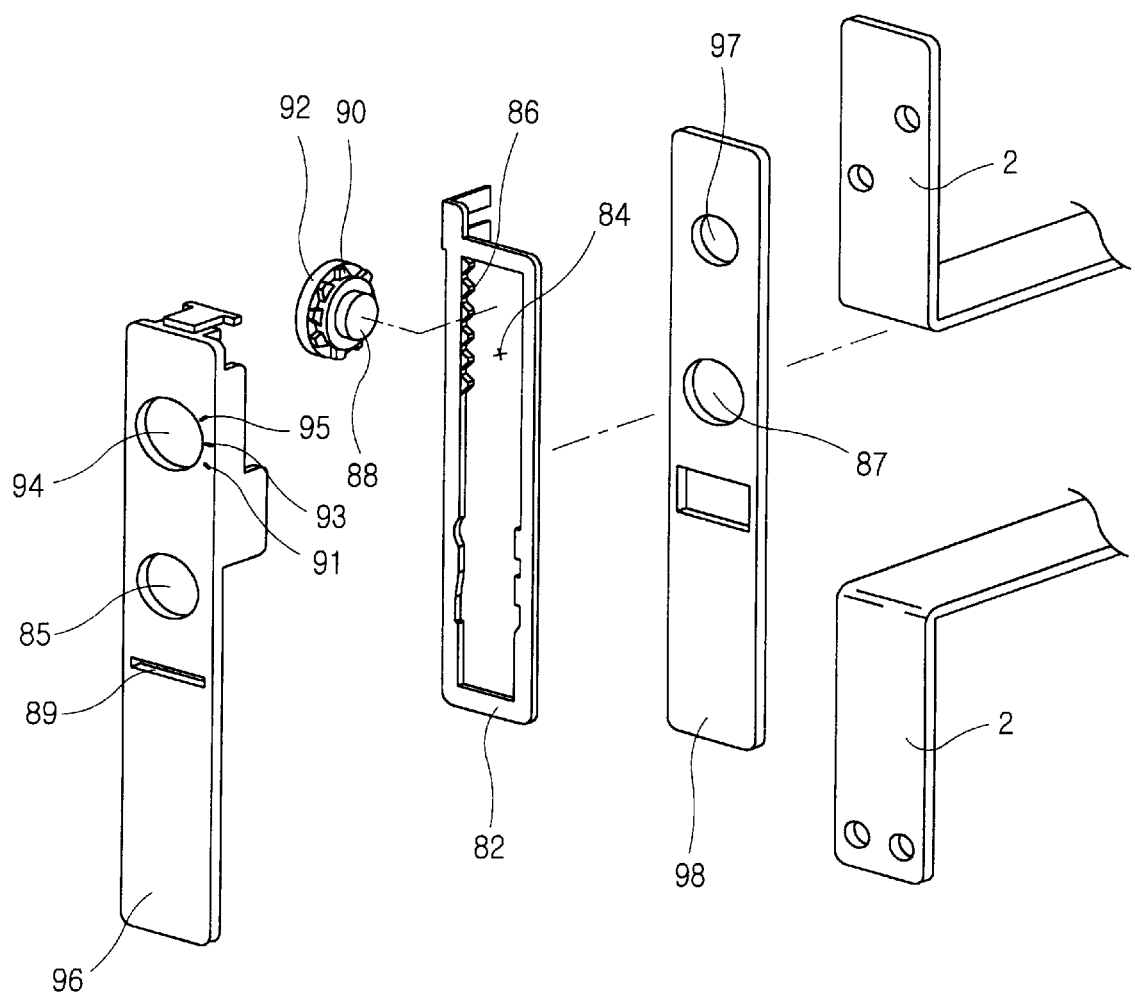
FIG. 10 is a disassembled perspective view illustrating a indicating apparatus in accordance with another embodiment of the present invention.

A position indicating apparatus in accordance with another embodiment of the present invention will be described with reference to accompanying FIG. 10 as a disassembled perspective view.

The position indicating apparatus of the breaker body in accordance with another embodiment of the present invention is constructed with a rack gear 86 included in a first power converting means and a pinion gear 90 meshed with the rack gear 86 and a pinion gear 90 rotating by a linear movement of the first power converting means, the detailed construction and operation will be described as below.

The position indicating apparatus of the breaker body in accordance with another embodiment of the present invention includes the first power converting means for converting the rotation of the cam 22 into the linear motion, the first power converting means is a movable plate 82 having a guide hole 84 in the length direction, connected to the cam 22 and moving up and down according to the rotation of the cam 22. A second power converting means is constructed with the rack gear 86 installed on one surface of the guide hole 84 of the movable plate 82 and the pinion gear 90 meshed with the rack gear 86 and rotating according to the up and down movement of the movable plate 82. The position indicating apparatus of the breaker body in accordance with another embodiment of the present invention further includes an indicating cam 92. The indicating cam 92 includes a disc shape portion, a position indicating portion respectively extended from the upper and bottom surfaces of the disc shape portion and a rotation axis portion 88. The pinion gear 90 meshed with the rack gear 86 is provided on the outer circumference of the disc shape portion. The rotation axis portion 88 penetrates the hole 84 of the movable plate 82 and is supported by the inner circumference of the supporting hole 97 of the guide plate 98. The pinion gear 90 of the indicating cam 92 is meshed with the rack gear 86 of the movable plate 82, when the movable plate 82 moves vertically, the indicating cam 92 rotates. A position indicating mark is placed at the position indicating portion 80 of the indicating cam 92 in order to indicate a position of the breaker body 200 according to the rotation of the indicating cam 92, the position indicating mark can be formed as any shape for making the user distinguish a position of the breaker body 200.

In the another embodiment of the present invention, the indicating mark on the position indicating portion 80 is formed as an arrow shape, a position of the breaker body 200 can be indicated with the arrow. A front plate 96 is fixed at a front position of the movable plate 82, and a hole 94 for receiving the position indicating portion 80 of the indicating cam 92 is provided at the upper portion of the front plate 96. A transparent window according to the preferred embodiment of the invention can be installed on the hole 94. A handle insertion hole 85 for inserting the handle rotating the lead screw 4 is formed at the center of the front plate 96 in the length direction, and the overall shape of the front plate 96 is a flat plate shape. A horizontal slit 89 formed at the lower portion of the handle insertion hole 85 is a groove for drawing out or pushing in a slide bar of the locking device 10 for locking a position of the breaker body 200.

In the front plate 96, a position marking portion is provided at a position near the circumference of the hole 94 in order to indicate selectively a position of the breaker body 200 by the arrow on the position indicating portion 80 by the rotation of the indicating cam 92. The position marking portion includes a disconnected position marking portion 91, a testing position marking portion 93 and a connected position marking portion placed at regular intervals.

The guide plate is placed between the movable plate 82 and the base frame 2, has a flat plate shape and guides the up and down vertical movement of the movable plate 82, it includes a supporting hole 97 supporting the rotation axis portion 88 of the indicating cam 92 rotatively and a handle insertion hole 87 for passing the handle is formed at the center portion in the length direction.

The operation of the position indicating apparatus in accordance with another embodiment of the present invention will be described. When the movable plate 82 moves up and down, the linear motion of the movable plate 82 is converted into the rotation motion by the operation of the rack gear 86 and the pinion gear 92, accordingly the indicating cam 92 rotates. When the indicating cam 92 rotates, the arrow on the position indicating portion 80 selectively indicates one of the three position marking portions, accordingly a present position of the breaker body 200 is indicated.

As described above, a position indicating apparatus of an air circuit breaker in accordance with the present invention indicates a position of a breaker body by rotating an indicating cam and indicating one of position marking portions on a front plate when a movable plate moves up and down according to translocation of the breaker body, accordingly a user can distinguish a position of the breaker body accurately.

What is claimed is:

1. In an air circuit breaker comprising;
    a movable breaker body having a power source terminal and a load terminal and connecting or disconnecting a circuit between an electrical power source and an electrical load, a cradle electrically and mechanically connected to or separated from the breaker body in accordance with movement of the breaker body and having connectors for electrically and mechanically connecting to the breaker body, a screw pipe for guiding the connecting to or separating from the breaker body and a power source terminal and a load terminal respectively connected to the electrical power source and the electrical load, a base frame fixed to the breaker body, a lead screw supported by the base frame so as to be rotatable and movable to a position for being inserted into the screw pipe and a position for being separated from the screw pipe, a lead bar assembly having a lead bar supported by the base frame so as to perform a horizontal linear movement, extended so as to be parallel with the lead screw and linearly moving a distance corresponded to the translocation of the lead screw in a direction opposite to a moving direction of the lead screw when the lead bar is pushed in or drew out from the lead screw pipe and a spring for applying an elastic force to the lead bar in the insertion direction of the lead screw, a cam connected to the lead bar and for converting the linear movement of the lead bar into a rotation movement and a position indicating apparatus connected to the cam and for indicating a position of the breaker body according to the translocation of the lead screw, the position indicating apparatus comprising;
    a first power converting means connected to the cam and for converting the rotation of the cam into a vertical linear motion;
    a second power converting means connected to the first power converting means and for converting the linear motion of the first power converting means into a rotation motion; and
    an indicating means for indicating a position of the breaker body according to the rotation motion of the second power converting means.

2. The air circuit breaker according to claim 1, wherein the first power converting means includes;
    a movable plate connected to the cam and movable up and down according to the rotation of the cam.

3. The air circuit breaker according to claim 1, wherein the second power converting means includes;
    a cam connected to the first power converting means and for converting the linear motion of the first power converting means into the rotation motion.

4. The air circuit breaker according to claim 1, wherein the second power converting means includes;
    a rack gear provided in the first power converting means; and
    a pinion gear meshed with the rack gear and rotatable according to the linear motion of the first power converting means.

5. The air circuit breaker according to claim 1, wherein the indicating means includes:
    a position indicating portion provided in the second power converting means and for indicating a position of the breaker body; and
    a position marking portion for selectively being indicating the a position of the breaker body by the position indicating portion.

6. The air circuit breaker according to claim 1, wherein the indicating apparatus includes;
    a movable plate connected to the cam for converting the rotation of the cam into a linear motion in the vertical direction;
    an indicating cam connected to the movable plate for converting the linear motion of the movable plate into a rotation motion and having an indicating portion for indicating a position of the breaker body; and
    a front plate having a position marking portion for selectively indicating one of a plurality of positions of the breaker body by the indicating portion of the indicating cam.

* * * * *